United States Patent [19]

Hwang

[11] Patent Number: 4,796,650
[45] Date of Patent: Jan. 10, 1989

[54] STRUCTURE FOR A FLOAT VALVE ASSEMBLY

[76] Inventor: Biing-Yih Hwang, 89, LinYuan South Road, LinYuan Shian, Kaohsiung Hsien, Taiwan

[21] Appl. No.: 127,263

[22] Filed: Dec. 1, 1987

[51] Int. Cl.⁴ .................... F16K 31/26; F16K 33/00
[52] U.S. Cl. .................... 137/443; 137/444; 137/446; 137/448
[58] Field of Search .......... 137/434, 442, 443, 444, 137/446, 448

[56] References Cited

U.S. PATENT DOCUMENTS

| 348,364 | 8/1886 | Weeden | 137/443 |
|---|---|---|---|
| 653,628 | 7/1900 | Parton | 137/443 |
| 945,569 | 1/1910 | Millea | 137/444 |
| 955,457 | 4/1910 | Geurink | 137/444 |
| 1,219,690 | 3/1917 | Barber | 137/434 |
| 1,466,767 | 9/1923 | Stoffel | 137/446 |
| 1,579,140 | 3/1926 | Phillips | 137/444 |
| 2,197,686 | 4/1940 | Flutsch et al. | 137/444 |
| 2,470,213 | 5/1949 | Clemmons | 137/444 |
| 2,559,046 | 7/1951 | Peters et al. | 137/448 |
| 2,614,532 | 10/1952 | Steel | 137/443 |
| 2,756,769 | 7/1956 | Martin et al. | 137/443 |

FOREIGN PATENT DOCUMENTS 606167  7/1960  Italy ................ 137/443

Primary Examiner—George L. Walton
Attorney, Agent, or Firm—Larson and Taylor

[57] ABSTRACT

An improved structure for a float valve assembly, utilizing a resisting disc which can be urged against or open the water outlet of the valve to stop or open the water flowing passage by the interrelated movement of a float, a float rod, a moving member, a cap and the resisting disc. The flowing direction of the water in the valve, i.e. the water pressure, can help push the resisting disc in covering up the outlet so the water flow can be stopped more easily and more effectively.

4 Claims, 6 Drawing Sheets

STRUCTURE FOR A FLOAT VALVE ASSEMBLY

BACKGROUND OF THE INVENTION

A conventional float valve assembly stops water flow by means of a float valve, but the resisting disc of rubber in the valve has rather little resisting force against the water pressure when the water pressure is large. So it can hardly keep water from leaking in a water tower, and as the result the water in the water tower often overflows. Such a conventional float valve can get out of order quite easily, especially, if it cannot efficiently cope with a high water pressure, as its method of stopping water is against the water flowing direction.

SUMMARY OF THE INVENTION

This invention concerns an improved structure for a float valve assembly. It includes a valve body able to connect with a water pipe and provided with an inlet, an outlet, an inwardly protruding circular edge at the outlet for a resisting disc and an anti-leak gasket to lean against, a pair of ears set at the upper outside of the outlet for uniting a moving member which also can be connected with a float rod. The float rod connected with a float at one end can turn up or down with a pin connected with the other end as an axis to move the moving member whose protruding-down foot then can pull forward or backward a cap connected with a resisting disc in the valve body with the result that the outlet can be either closed or opened by the resisting disc. The important point is that when the resisting disc closes the outlet, the flowing direction of the water is the same as the moving direction of the resisting disc in closing so that the water pressure can help the resisting disc close the outlet more tightly.

DETAILED DESCRIPTION OF THE INVENTION

Figure 1:
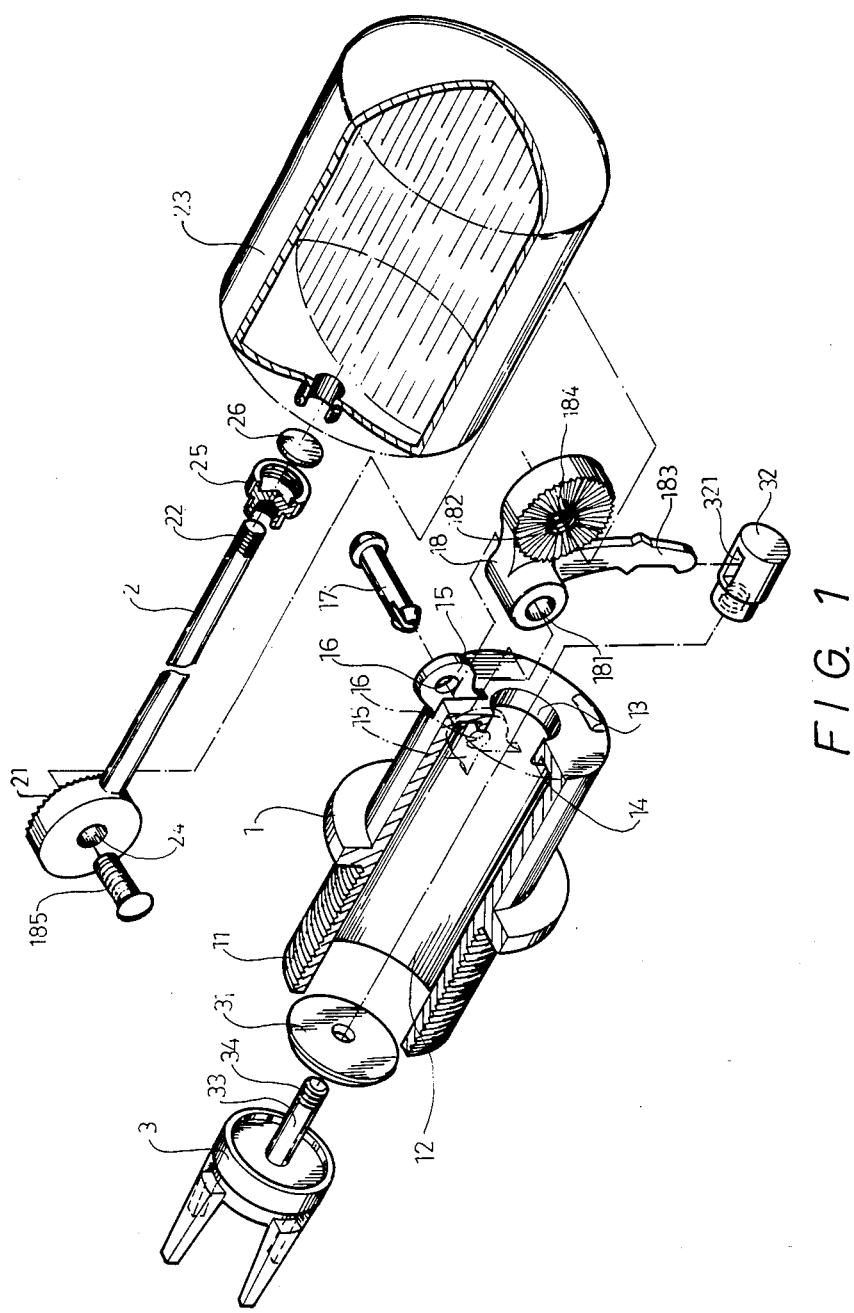
FIG. 1 is an expoded perspective view of the first example in this invention.

First, this new structure for a float valve assembly includes valve body 1, float rod 2 and resisting disc 3 as the main parts as shown in the FIG. 1.

Valve body 1 made of metal is provided with male thread 11 for a water pipe to unite with, inlet 12 and outlet 13 for water to flow in and out.

Inwardly protruding circular edge 14 is provided at outlet 13 for anti-leak gasket 31 to lean against in order to prevent water from leaking out; a pair of ears 15 with round holes 16 are provided at the upper outside of outlet 13 for inspection of and pin 17 also inserts through axis hole 181 of moving member 18 which is thus united with valve body 1 and able to turn with pin 17 as an axis. Moving member 18 is also provided with tooth disc face 182 for engagement with tooth disc face 21 set at one end of float rod 2 and screw hole 184 bored at the center of tooth disc face 182 receives screw 185 to combine tightly together tooth disc faces 182 and 21. Moving member 18 is also provided with foot 183 extending downward, which can be inserted through rectangular hole 321 of cap 32, and thus move cap 32.

Next, float rod 2 is provided at one end with tooth disc face 21 which engages tooth disc face 182 of moving member 18, and round hole 24 bored at the center of tooth disc face 21 receives screw 185 to join float rod 2 and moving member 18 as one unit; thus the angle of float rod 2 between the water surface can be altered so as to control the height of the water surface in the water tower.

Float 23, which is able to float on a water surface and to be filled with some water, is combined with lid 25 with the coupling of threads, anti-leak gasket 26, placed against lid 25, can prevent the water from leaking out of float 23 and lid 25 is also combined with float rod 2 by means of female threads with the result that float 23 is also combined with float rod 2.

Resisting disc 3 to be placed inside valve body 1 is provided at its center with post 33 extending through anti-leak gasket 31, which is adhered to resisting disc 3, and and protrudes out of outlet 13, and post 33 has threads 34 at its front end to unite with cap 32. Anti-leak gasket 31, which has a larger area than outlet 13 functions to cover up outlet 13 for stopping water from flowing into the water tower. Cap 32 is provided with rectangular hole 321 for foot 183 of moving member 18 to insert through and to pull cap 32 back or forth in a limited distance.

Figure 2:
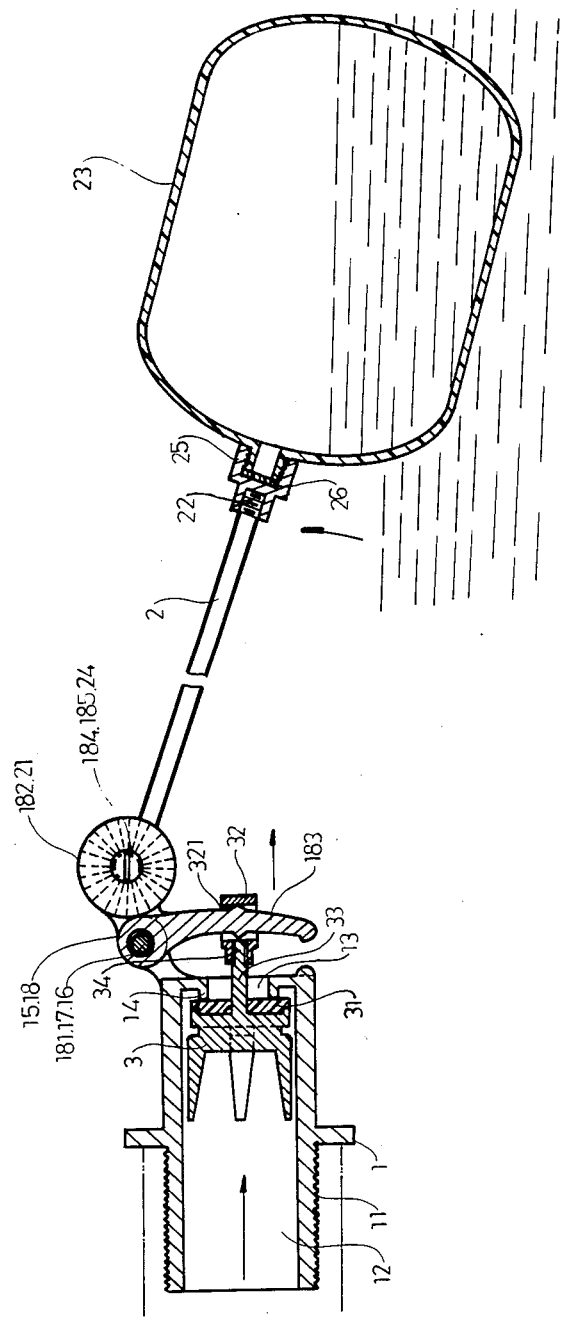
FIG. 2 is a cross-sectional view of the first example under the situation wherein the water is being stopped.

Next, the first example of this float valve assembly shown in FIG. 2 is under the position that the float valve is closed, stopping water. Under this position float 23 has been raised up by the water surface in the water tower to the level that float rod 2 turning upward with pin 17 as the axis causes moving member 18 to turn at the same time to the extent that its foot 183 acquired a force to pull outward (or forward) as the arrow in FIG. 2 shows. Then cap 32 pulled outward by moving member 18 could pull resisting disc 3 which in turn pushed anti-leak gasket 31 to cover up inwardly protruding edge 14 of outlet 13, and the water pressure exerts a pressure against resisting disc 3 as shown by the arrow in the figure with the result that the flow stopping function of resisting disc 3 and anti-leak gasket 31 against outlet 13 can be reinforced.

Figure 3:
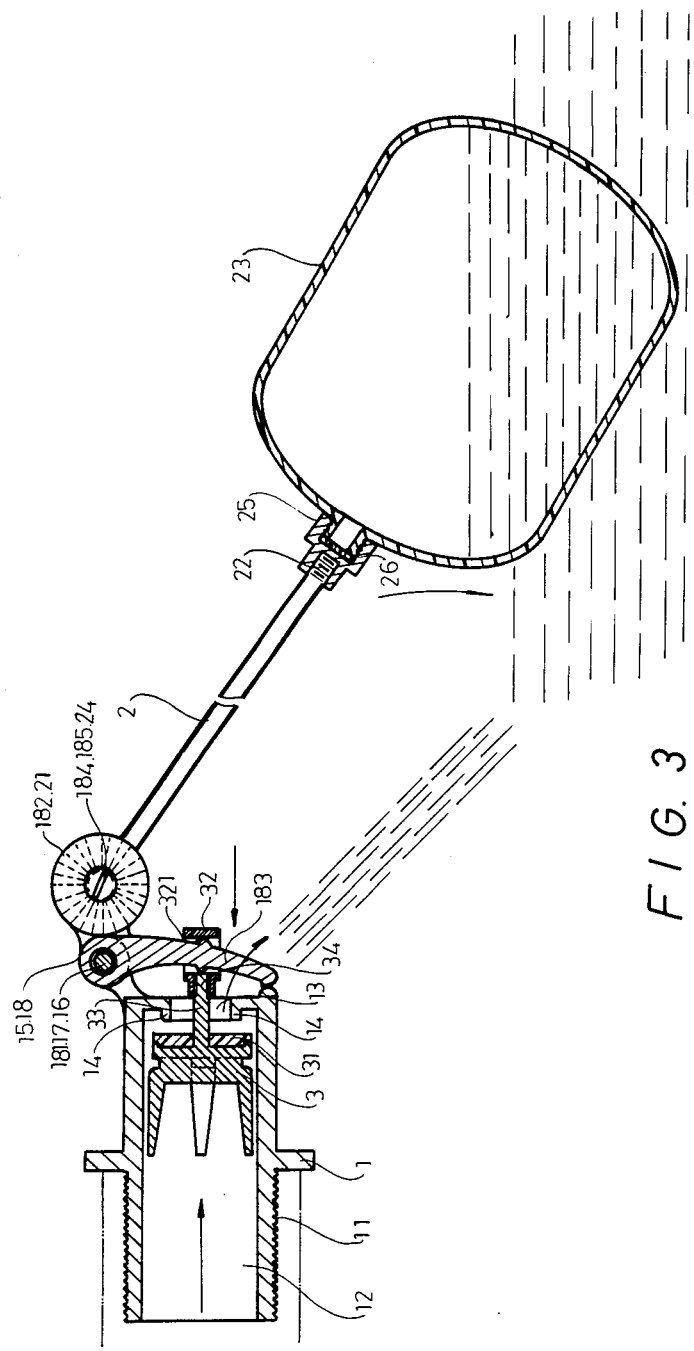
FIG. 3 is a cross-sectional view of the first example under the situation wherein the water is flowing out.

Next, FIG. 3 shows this float valve assembly under the position that the float valve is opened. Under this position float 23 has fallen down owing to its own weight together with the water surface in the water tower to such a level that resisting disc 3 and anti-leak gasket 31 are pushed inward (or backward) to open outlet 13, allowing water flow out of outlet 13 by cap 32 which was pushed by foot 183 of moving member 18 turned by float rod 2 having turned down with pin 17 as the axis by the movement of float 23.

Figure 4:
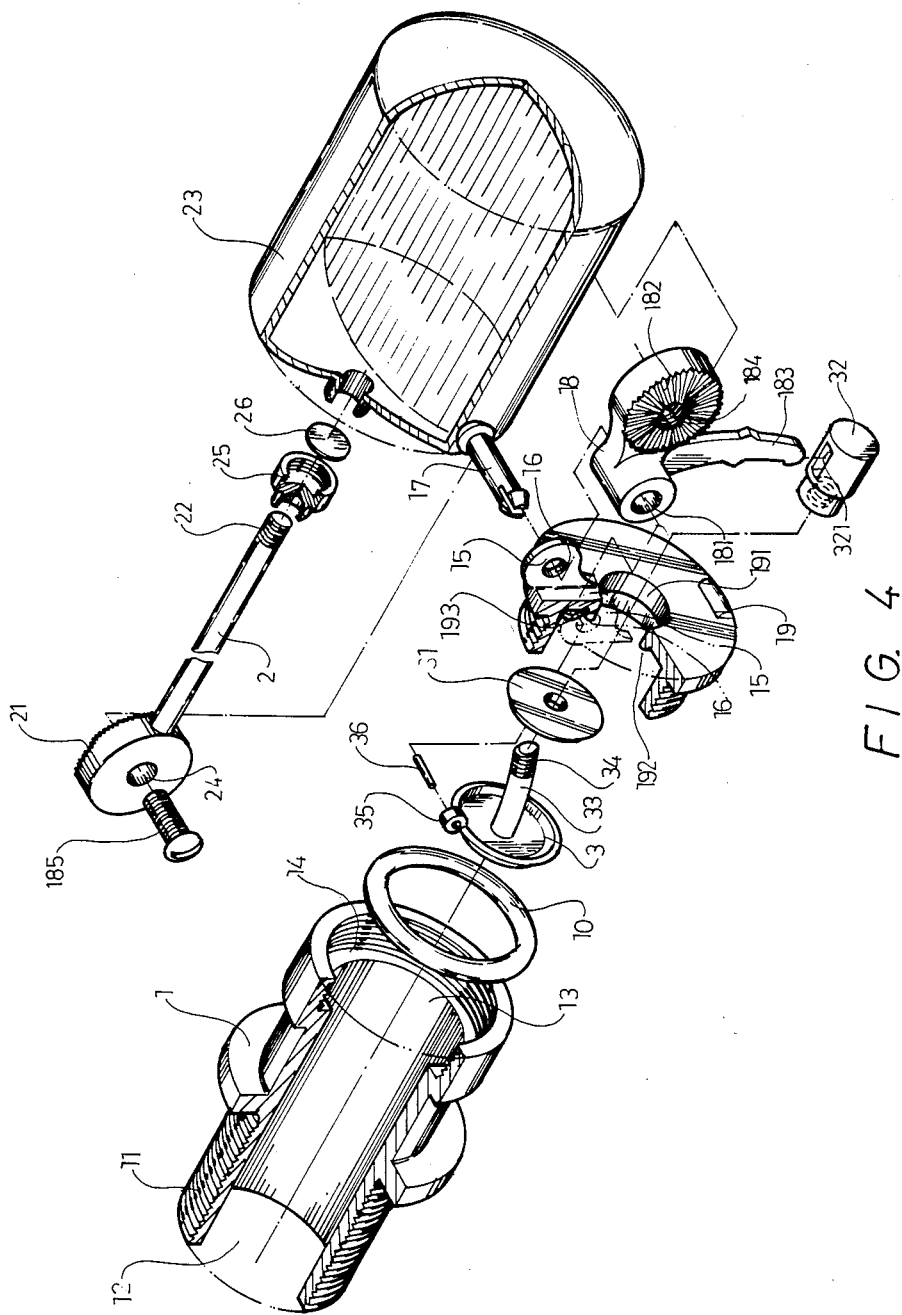
FIG. 4 is an exploded perspective of the second example in this invention.
Figure 5:
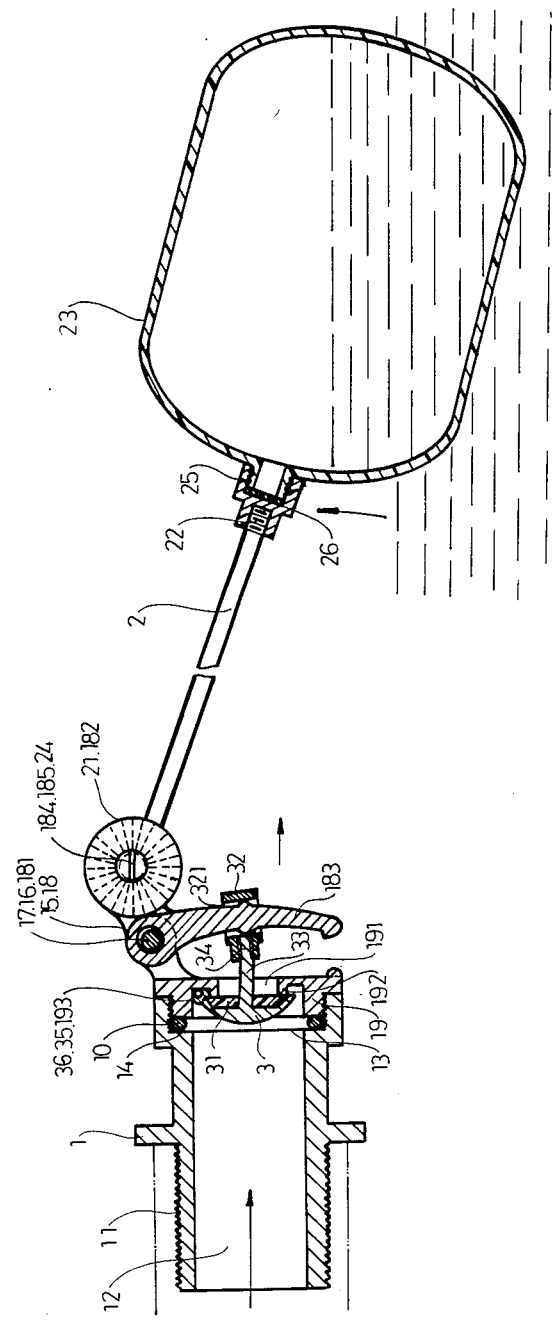
FIG. 5 is a cross-sectional view of the second example under the situation wherein the water is stopped.
Figure 6:
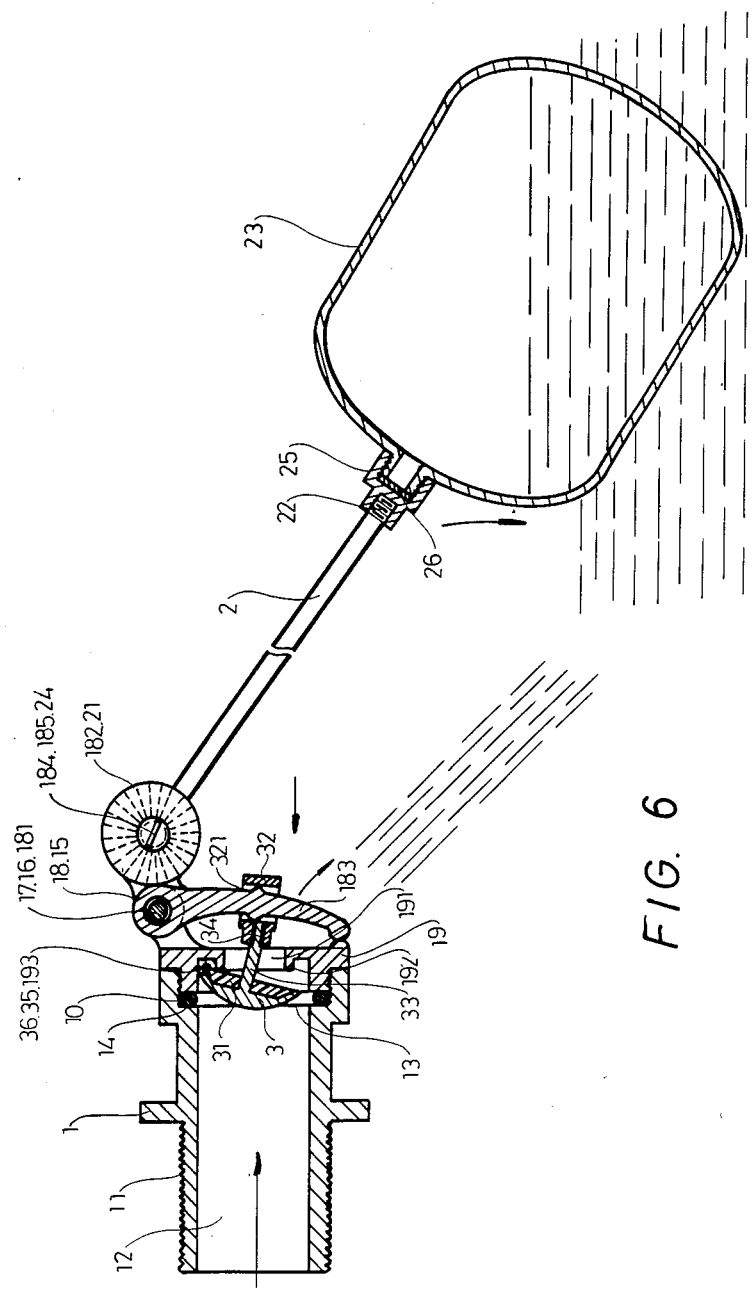
FIG. 6 is a cross-sectional view of the second example under the situation wherein the water is flowing out.

The improved structure of the first example shown in FIGS. 1, 2 and 3 is applied to those to be connected to the water pipe of less than one inch diameter, and the structure of the second example shown in FIGS. 4, 5 and 6 is applied to those used for a larger water pressure. The structure of the second example is almost the same except the structure of resisting disc 3 and the setting of lid 19. Next, the second example is to be described.

Valve body 1 made of metal is provided with thread 11 to connect with a water pipe, inlet 12 and downstream opening 53. Female thread 14 is provided at opening 53 for uniting lid 19, which has outlet 191 corresponding to outlet 13 of FIGS. 1-3, inwardly protruding circular edge 192 and a pair of ears 15 at its upper outside. Ears 15 have round holes for receiving pin 17 for combining lid 19 with moving member 18 whose axis hole 181 also receives pin 17. Moving member 18 is also provided with tooth disc face 182 to engage with tooth disc face 21 of float rod 2 and both tooth disc faces 182, 21 are tightly screwed together with screw 185 inserted in screw hole 182 and round hole 24, so both moving member 18 and float rod 2 are tightly united and moved as one unit. In addition, moving member 18 is also provided with foot 183 extending downward for insertion through rectangular hole 321 of cap 32. And anti-leak gasket 10 is placed between lid 19 and valve body 1 to attain better anti-leak function.

Next, float rod 2 is also provided at one end with tooth disc face 21 to engage with tooth disc face 182 of moving member 18, and with thread 22 to unite with lid 25 of float 23 which can also store some water to increase its own weight.

Resisting disc 54 is a little different from disc 3 of the first example having at its top ear 35 a hole for insertion of pin 36, which also inserts through ear 193 provided at the inside of lid 19. The setting of lid 19 is also the difference from a first example, wherein lid 19 does not exist. Resisting disc 54 also has post 55 extending through the center of anti-leak gasket 321 with its threaded end united with cap 32.

When float 23 has been raised up as shown in FIG. 5 by the water surface in a water tower to a certain level, float rod 2 can turn upward with pin 17 as the axis, and foot 183 can then be given a force to pull outward cap 32, which in turn pulls resisting disc 54 to urge anti-leak gasket 31 tightly against protruding edge 192 of outlet 191, and then the water is stopped. Moreover, the greater the water pressure in the water pipe, the better the anti-leak function of resisting disc 54.

On the contrary, as shown in FIG. 6, when float 23 has fallen down owing to its own weight with the water surface to a certain level, float rod 2 can turn down with pin 17 as the axis causing foot 183 of moving member 18 to move inward and resisting disc 54 and anti-leak gasket 31 also interrelatingly to move inward to leave outlet 191 so that the water in the valve can flow out of outlet 191 into the water tower.

In general, the structure of this invention utilizes the flowing direction of the water in the pipe in stopping water, so the larger the water pressure, the better the anti-leak effect. Consequently, overflow from a water tower will never happen, if this invention is used.

What is claimed is:

1. A float valve assembly comprising:
   a valve body comprising an elongated enclosed tube having an upstream end and a downstream end, and being of generally cylindrical cross-section between said ends, the upstream end of the tube having means for connection to a water supply, the downstream end of the tube having a shoulder so as to define an outlet opening directly at said end of reduced cross-section relative to the internal cross-section of the tube, said shoulder including a circular edge which extends back into the elongated tube to form a valve seat of the outlet opening directly at said end thereof said valve body having ears directly on the downstream end and being adjacent to said outlet valve seat said ears having openings therethrough and a pin inserted therethrough to unite the valve body with a moving member,
   said moving member having an axis hole therethrough for also receiving said pin, said moving member also engaging and removably secured to a float rod such that the moving member and the float rod pivot together about the pin axis, and said moving member also having a foot extending downwardly and inserted through an opening in a cap,
   a resisting disc within the elongated tube of the valve body, said disc provided with an axially extending post which is united to a central opening of said cap, said resisting disc also having attached thereto said anti-leak gasket which is movable against the said protruding edge of the outlet to close the same,
   wherein when the float is raised up by the water surface to a certain level, the float rod turns up with the pin passing through the axis hole of the moving member as the axis, causing the foot of the moving member to pull the cap outward, in turn pulling outward the resisting disc together with the anti-leak gasket to urge them against the inwardly protruding edge of the outlet to stop the water flow, with the aid of the water pressure acting against the resisting disc, and wherein when the flow has moved down as the water surface is lowered, the float rod turns down with the said pin as the axis, causing interrelated movement of the said foot of the moving member, the cap, the resisting disc and the anti-leak gasket to open the outlet.

2. A float valve assembly according to claim 1, said outlet being formed out of the same element as the elongated tube of the valve body.

3. A float valve according to claim 1, including an outlet lid which is a separate member from the elongated tube of the valve body and which is attached to the end of the elongated tube, in fluid tight relationship therewith, the outlet opening with the inwardly protruding edge being formed on the outlet lid, and said ears also being formed on the outlet lid.

4. A float valve assembly according to claim 3, the resisting disc being pivotally connected to the lid, such that it opens the outlet opening of the lid by turning about its pivot connection with the lid, and said axially extending post being curved to accomodate the pivotal movement of the resisting disc.

* * * * *